UNITED STATES PATENT OFFICE.

WM. BUTCHER AND WM. A. BUTCHER, OF PHILADELPHIA, PENNSYLVANIA

IMPROVEMENT IN COATING METALLIC SURFACES.

Specification forming part of Letters Patent No. 20,697, dated June 29, 1858; Reissue No. 862, dated December 6, 1859.

*To all whom it may concern:*

Be it known that we, WILLIAM BUTCHER and WILLIAM A. BUTCHER, of Philadelphia, in the State of Pennsylvania, have invented a new and useful improvement in the process for coating metallic surfaces with a certain composition, hereinafter described, which will protect such surfaces against the action of the usual oxidizing agents, of which the following is a specification.

We use for this purpose a composition or preparation of india-rubber or allied gum and linseed-oil, secured to us by Letters Patent bearing date the 15th day of September, 1857; and the object of our present invention is so to apply the said composition to metallic surfaces that it shall adhere thereto firmly and permanently, and exclude therefrom the atmosphere and moisture, and all other agents which usually oxidize metals, and at the same time render the composition, when so applied, hard and durable, and not liable to be cracked by the expansion and contraction or the bending of the metal.

To make the composition just referred to we take one gallon of linseed-oil and put into it from eight to twelve pounds of crude india-rubber or allied gum, the quantity being varied, as the coating is required to be of greater or less consistency, and we then boil the oil in a suitable vessel until the rubber is entirely dissolved in and thoroughly mixed with it, the boiling-point of oil being a suitable degree of heat for the purpose.

The process by which we apply the composition is as follows: We take the piece of metal desired to be coated and heat it, in an oven or other apparatus suitable for the purpose, to a temperature of about 350°, and then, and while so heated, insert it in the prepared mixture of oil and rubber, and let it remain until it is coated with the preparation to the thickness required. It is then taken out of the preparation and placed in an oven or other suitable apparatus and heated to a temperature of about 200°, and baked therein until its coating is properly hardened, and after it is taken from the oven and cooled sufficiently to be handled it is ready to be put to the use and purpose for which it was intended. The metal requires no other previous preparation, although it will be found advisable to remove from the surface any rust or other impurity. The same process is employed for all descriptions of metal which may require to be coated with the preparation. It may also be employed for coating with the preparation various articles of metal after they are manufactured, such as water, gas, and drain pipes, sinks, wash-boilers, and many others which are exposed to the action of water, and which are subject to decay from rust, or which may be exposed to the action of the weather, such as metallic roofing-plates, iron railings, iron buildings, or iron columns, and ornaments for brick or other buildings.

The coating, when properly applied, as herein described, to metallic surfaces that are only exposed to the action of vapor or of the atmosphere, and are not subjected to frictional wear or handling, will remain perfect for a great length of time, so that it is peculiarly applicable to exposed metal-work, such as before named, that now requires to be frequently painted to protect it from oxidation from atmospheric and other causes to which it might otherwise be exposed; and its application in this way also serves to make these metallic works much more durable than when they are protected by any of the means at present in use for that purpose.

We do not claim the composition of india-rubber and linseed-oil herein described as making part of the invention herein claimed, as such composition is secured to us by other Letters Patent; nor do we claim the application of all kinds of water-proof compositions to metallic surfaces, whether with or without heat, as other compositions—such as laquering, japanning, &c.—have been applied to metals for protecting them against the action of oxidizing agents.

What we do claim as our invention, and desire to secure by Letters Patent, is—

The combined process, substantially as herein described, of coating metals with the composition made of india-rubber or allied gum dissolved in and combined with linseed-oil in a heated state, in proportions substantially such as set forth, by first heating the metal to be coated to about 350°, applying the composition to the metal surface while so heated, and then subjecting the metal so coated to about 200° of heat, substantially as described.

WM. BUTCHER.
WM. A. BUTCHER.

Witnesses:
ANDREW DE LACY,
CHS. HARTWELL.